(12) United States Patent
Yang et al.

(10) Patent No.: US 9,054,897 B2
(45) Date of Patent: Jun. 9, 2015

(54) METHOD AND APPARATUS FOR SYNCHRONIZING AAL2 PATH STATES

(75) Inventors: Jian Yang, Shanghai (CN); Xuling Xiao, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 682 days.

(21) Appl. No.: 13/376,258

(22) PCT Filed: Mar. 19, 2010

(86) PCT No.: PCT/CN2010/071141
§ 371 (c)(1),
(2), (4) Date: Dec. 5, 2011

(87) PCT Pub. No.: WO2011/000229
PCT Pub. Date: Jan. 6, 2011

(65) Prior Publication Data
US 2012/0087366 A1    Apr. 12, 2012

(30) Foreign Application Priority Data
Jun. 30, 2009   (CN) .......................... 2009 1 0054171

(51) Int. Cl.
H04L 12/54    (2013.01)
H04L 12/70    (2013.01)

(52) U.S. Cl.
CPC ....... H04L 12/5601 (2013.01); *H04L 2012/563* (2013.01); *H04L 2012/5656* (2013.01)

(58) Field of Classification Search
CPC ........... H04W 4/00; H04W 8/00; H04W 8/02; H04W 8/22; H04W 28/00; H04W 28/02; H04W 56/0005; H04L 12/28; H04L 12/54; H04L 12/56; H04L 12/5689; H04L 12/5601; H04L 12/563; H04L 12/5656

USPC .................................. 370/248, 252, 235, 247
See application file for complete search history.

(56) References Cited

U.S. PATENT DOCUMENTS 6,760,335 B1 *   7/2004   Andersson et al. ......... 370/395.2
2007/0189236 A1 *   8/2007   Ranta-aho et al. ............ 370/335

FOREIGN PATENT DOCUMENTS

CN          1848755 A    10/2006
CN        101257438 A     9/2008
(Continued)

OTHER PUBLICATIONS

International Search Report for International Application No. PCT/CN2010/071141 filed Mar. 19, 2010.
(Continued)

*Primary Examiner* — Anh Ngoc Nguyen
(74) *Attorney, Agent, or Firm* — Harness, Dickey & Pierce, P.L.C.

(57) ABSTRACT

The present invention provides a method and apparatus of synchronizing AAL2 path states between ATM adaptation layer type 2 (AAL2) signaling nodes, wherein a AAL2 signaling node as a synchronization requesting end sends a path state request message to a peer AAL2 signaling node of an AAL2 path, the peer AAL2 signaling node performs local check on the state of the AAL2 path designated by the request message after receiving the request message, and the peer AAL2 signaling node controls consistency synchronization processing on the AAL2 path states at two ends based on the result of the check. The present invention may avoid initial call failure incurred by inconsistency between states at two ends of an AAL2 path and improves success ratio of AAL2 path establishment.

16 Claims, 4 Drawing Sheets

(56) References Cited

FOREIGN PATENT DOCUMENTS

| EP | 1575223 A1 | 9/2005 |
|----|------------|--------|
| JP | 2003124995 A | 4/2003 |
| WO | WO-2007093087 A1 | 8/2007 |

OTHER PUBLICATIONS

Office Action for corresponding Japanese Application No. 2012-518006 dated Jun. 25, 2013 and English translation thereof.

Supplementary Search Report for corresponding European Application No. 10793524.9 dated Jun. 4, 2014.

"AAL type 2 signalling protocol (Capability Set 1); Q.2630.1 (Dec. 1999)", ITU-T Standard, International Telecommunication Union, Geneva; CH, No. Q.26330.1 (Dec. 1999), Dec. 3, 1999, pp. 1-91, XP017461794, retrieved Aug. 15, 2001.

"AAL type 2 signalling protocol (Capability Set 1); Q.2630.1 Annex B (Mar. 2001)", ITU-T Standard, International Telecommunication Union, Geneva; CH, No. Q.26330.1 (Mar. 2001), Mar. 1, 2001, pp. 1-70, XP017463217, retrieved Dec. 13, 2001.

\* cited by examiner

METHOD AND APPARATUS FOR SYNCHRONIZING AAL2 PATH STATES

FIELD OF THE INVENTION

The present invention relates to the field of communication technology, and in particular relates to a method and apparatus for synchronizing AAL2 path states between AAL2 signaling nodes.

DESCRIPTION OF THE RELATED ART

AAL2 (ATM adaptation layer type 2) protocol proposed by the ITU-T (International Telecommunication Union Telecommunication Standardization Sector) and ATM (Asynchronous Transfer Mode) Conference may effectively bear application services with low bit-rate and being sensitive to time delay and may multiplex multi-path voice and data packets over an ATM connection to improve utilization efficiency of network resources.

ITU-T Q.2630.1 (2) AAL Type 2 Signaling Protocol-Capability Set 1 (2) is the most important protocol in the AAL2 signaling protocol. It mainly functions to establish or release AAL2 connection over a plurality of AAL2 links, allocate or release AAL2 resources, and maintain and control channels and paths, etc. This signaling protocol is widely applied between ATM switches in wideband network and mobile switches in the 3rd generation mobile communication network.

FIG. 1 is a basic flow of successfully establishing and releasing an ALL2 path. For the sake of illustration, the intermediate AAL2 switching nodes are not schematically shown. As an initiating end of the establishment, switch A selects an appropriate channel resource CEID (identifier of the AAL2 connection element), including Path and Channel, according to the destination address and the routing configuration, and sends an ERQ (connection request) message to a neighboring node switch B. The neighboring node switch B, after receiving the ERQ message, checks the validity of the CEID and whether other access conditions are satisfied. If the answer is right, it enters into an Established state and sends an ECF (establishment confirmation) message to the switch A. The switch A also enters into the Established state upon receiving the establishment confirmation message ECF. When the switch A as a release initiating end performs release, it sends a REL (release) message to the neighboring node switch B. The switch B receives the REL message, finds a protocol entity at its own end, and performs the release operation, and thereafter sends a RLC (release completed) message to the initiating end.

However, in actual application, reasons such as software failure at the switches may result in that an AAL2 path is not effectively released at one side, such that the AAL2 path states at switches A, B are inconsistent, which may lead to initial call failure over the path.

Illustration of AAL2 call failure flow is made with reference to FIG. 2. The AAL2 path at the switch B side has been established, and its path state is local block. At this point, another corresponding end of the AAL2 path is established at switch A. Because the existing ITU-T Q.2630.1 standard does not provide relevant stipulation to synchronize states of the two ends of a newly established AAL2 path, the state of the newly established AAL2 path is idle at the switch A.

Because the state of the newly established AAL2 path is idle at the switch A, the switch A might utilize this AAL2 path to allocate resources to establish a new AAL2 call. That is, the switch A sends an ERQ (establishment request) message to the switch B to attempt to allocate this AAL2 path resource. However, because the actual state of the AAL2 path at the switch B is local block, the switch B will reject this ERQ (establishment request) message, thereby causing call failure at this time.

According to relevant stipulation in section 8.2.1.1.2.2 in ITU-T Q.2630.1, for switch B, if the state of AAL2 path is local block, as an input end, it needs to start the block flow upon receiving other request for establishing a new call than a test call, and sends a BLO (block request) message to the switch A that initiates the call. The switch A sends a BLC (block confirmation) to the switch B. Till now, after the initial call failure, the states at the two ends of the newly established AAL2 path will be consistent. That is, the state of the AAL2 path at the switch B is "local block" and the state of the AAL2 path at the switch A is "remote block". And then, the states of the two ends of the AAL2 path may be synchronized.

Of course, some switches may implement a re-call attempt mechanism that is not prescribed in the ITU-T Q.2630.1 but independently implemented by switches of various manufacturers.

SUMMARY OF THE INVENTION

The present invention aims to solve one or more of the previous technical problems and provides a technical solution of synchronizing states at two ends of a newly established AAL2 path.

According to one aspect of the present invention, there is provided a method of synchronizing AAL2 path states between AAL2 signaling nodes, comprising: sending, by a source AAL2 signaling node, a path state request message to a target AAL2 signaling node; the target AAL2 signaling node, after receiving the request message, performing local check to the state of an AAL2 path designated by the request message and controlling consistency synchronization processing on the states of the AAL2 path at two ends based on the result of check.

According to another aspect of the present invention, there is provided an AAL2 signaling node. The AAL2 signaling node, as a path state synchronization requesting end, comprises: sending means for sending a path state request message to a peer AAL2 signaling node; controlling means for performing consistency reset on the path state of present AAL2 signaling node based on the response message from the peer AAL2 signaling node.

According to a further aspect of the present invention, there is provided an AAL2 signaling node. The AAL2 signaling node, as a path state synchronization requested end, comprises: receiving means for receiving a path state request message sent from a peer AAL2 signaling node; controlling means for performing local check on the state of an AAL2 path designated in the request message and controlling consistency synchronization processing on the AAL2 path states at two ends based on the result of check.

According to a still further aspect of the present invention, there is provided a method for synchronizing AAL2 path states in an AAL2 signaling node. The AAL2 signaling node, as a path state synchronization requesting end, sends a path state request message to the destination AAL2 signaling node; and may perform consistency reset to the path state of present AAL2 signaling node based on the response message from the destination AAL2 signaling node.

According to a yet further aspect of the present invention, there is provided a method for synchronizing AAL2 path states in an AAL2 signaling node. The AAL2 signaling node, as a path request synchronization requested end, receives a path state request message form an AAL2 signaling node; performs local check on the state of the designated AAL2 path based on the request message and controls consistency synchronization processing on the AAL2 path states at two ends based on the result of check.

The present invention has the following technical advantages.

The states of the AAL2 path at two ends are synchronized before establishing the AAL2 path, such that it may avoid initial call failure incurred by inconsistent states at two ends of the AAL2 path.

The present invention may further avoid secondary call, such that it saves switch resources, helps switches to establish more stable, reliable, and accurate state machines, and improves the success ratio of establishing an AAL2 path.

BRIEF DESCRIPTION OF THE DRAWINGS

Features, properties, and advantages of the present invention will become more apparent through the following detailed description with reference to the accompanying drawings in which like elements have the same identifiers, wherein.

DETAILED DESCRIPTION OF THE INVENTION

Hereinafter, the preferred embodiments of the present invention will be described in detail with reference to the accompanying drawings.

Figure 1:
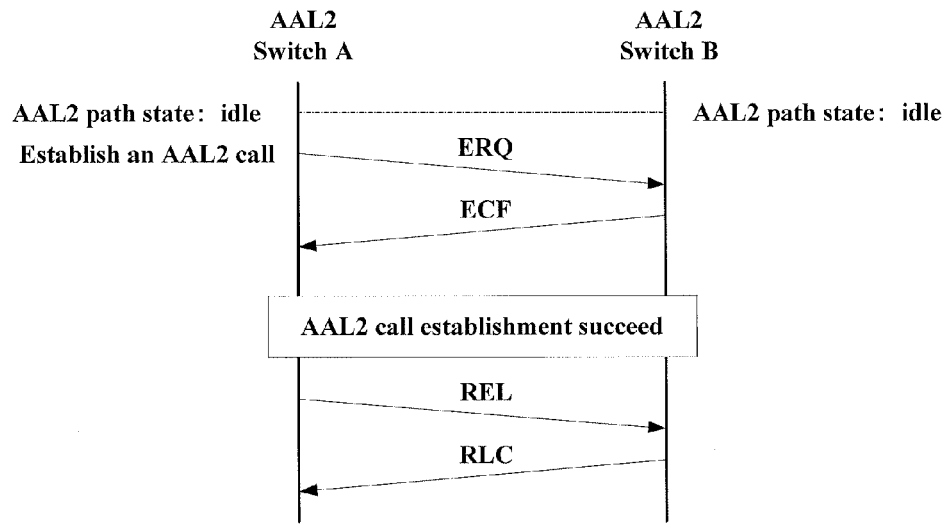
FIG. 1 is a typical flow of successfully establishing an AAL2 call.
Figure 2:
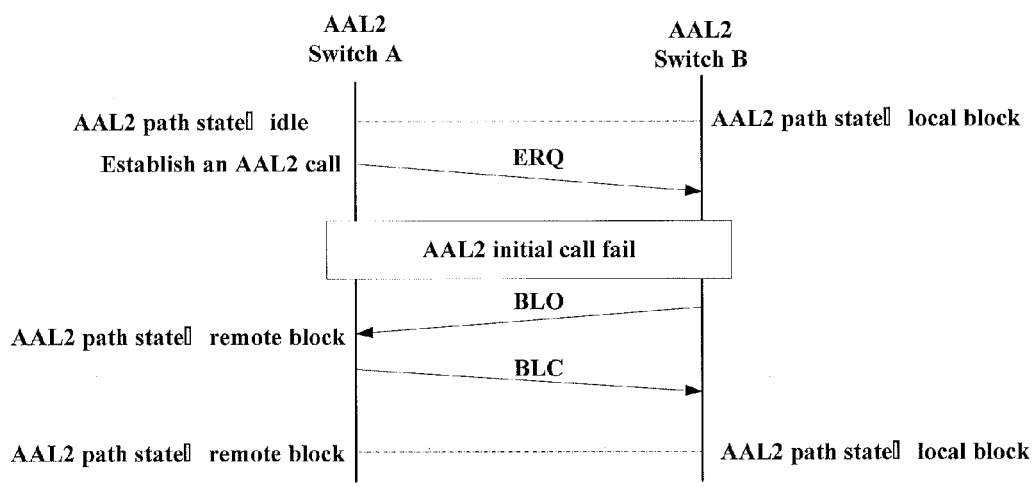
FIG. 2 is a typical flow of unsuccessfully establishing a call because of AAL2 path state inconsistency.
Figure 3:
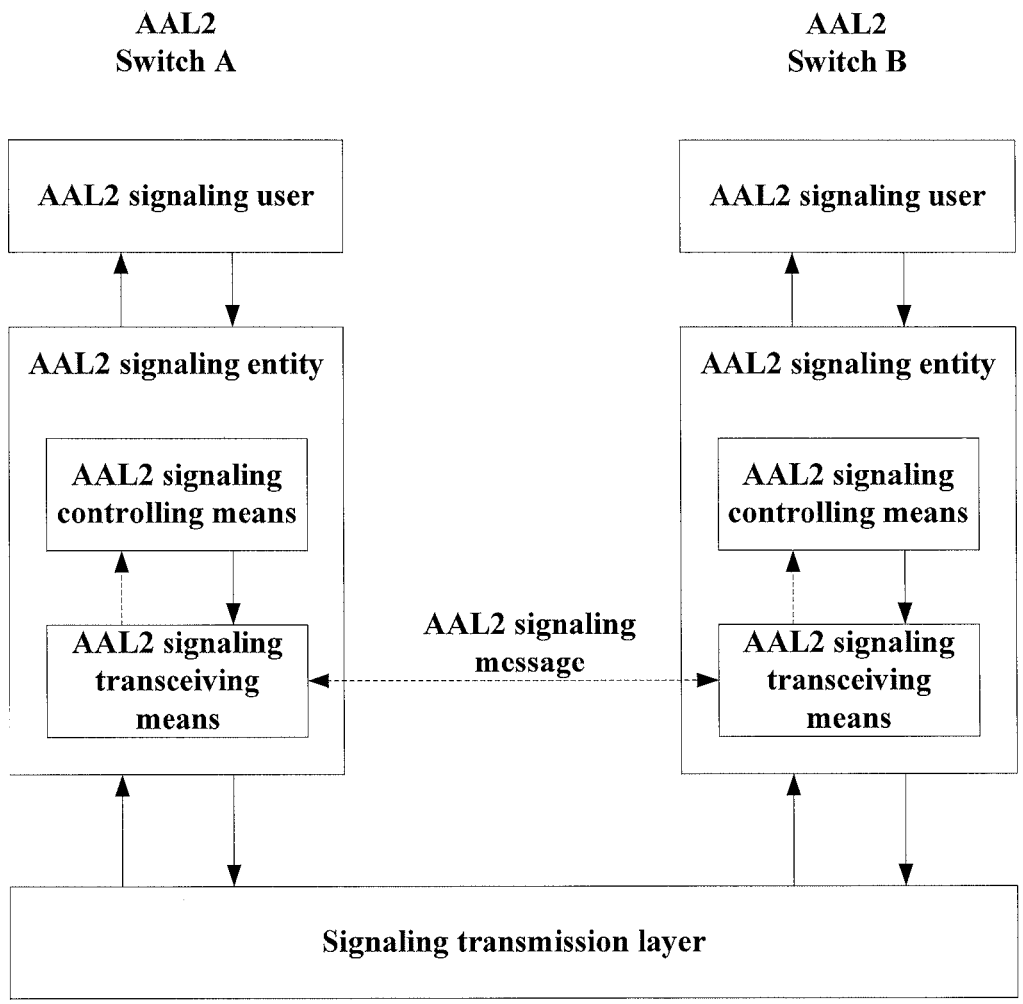
FIG. 3 is a typical instance of AAL2 signaling completion reference structure.

The instance of the ALL2 signaling completion reference structure according to the present invention is illustrated in FIG. 3, where AAL2 switchers A, B, as AAL2 service endpoints, may each comprise AAL2 signaling user, AAL2 signaling entity, and signaling transfer layer, wherein:

The AAL2 signaling user is an AAL2-based upper-layer signaling entity to which the AAL2 signaling entity provides corresponding services. The services provided by the AAL2 signaling entity to the upper-layer user signaling entity mainly comprise: establishing an AAL2 link, and releasing an AAL2 link.

The AAL2 signaling entity may comprise AAL2 signaling controlling means and AAL2 signaling transceiving means, wherein, the AAL2 signaling controlling means mainly process call procedure regarding ALL2 connection in the switch, for example, generating, assemblying, and analyzing ALL2 signaling messages and parameters, allocating and managing resources such as bandwidth, CID, controlling call admission, selecting routes, and establishing and releasing AAL2 path connection, etc. A typical AAL2 path may be a VCC (virtual channel connection) between two AAL2 signaling nodes, for bearing all ATM-based load information. The AAL2 signaling transceiving means performs AAL2 signaling message outgoing transmission, incoming reception, and path state maintenance, which may be implemented by a plurality of protocol processes, for example, outgoing transmission protocol process, incoming reception protocol process, and maintenance protocol process, the above processes may be dynamically created and deleted during the call process. An AAL2 path state may be identified inside the switch through a plurality of manners, for example, Outgoing/Incoming Release Pending, Outgoing/Incoming Modify Pending, etc., while from the perspective of the actual states at two ends of the path, they may be defined as "idle", "local block", and "remote block".

The signaling transfer layer may adopt the ATM transmission mode, which provides functions of a fixed-length ATM service data unit transmission to the upper-layer AAL2 protocol entity layer, for example, cell multiplexing/demultiplexing, generation and deletion of cell header, traffic management of cell, and cell rate adaptation, etc., and transmits ATM cells over a specific physical medium through the ATM physical layer functionality.

With reference to the embodiments of the present invention, before establishing an AAL2 path, the AAL2 signaling controlling means of the AAL2 switch A first performs AAL2 path state synchronization request. Specifically, it sends a path state request message to a peer AAL2 switch A of the AAL2 path. The request message may be an UBL (unblock request) message that comprises CEID (identifier of AAL2 connection unit) and OSAID (identifier of source signaling connection) information and the AAL2 path to which the UBL message is directed can be determined. The AAL2 signaling controlling means of the intermediate AAL2 switching node during the signaling transmission process, or of the AAL2 switch B as the AAL2 service endpoint (hereinafter uniformly referred to as the "AAL2 signaling node"), after receiving the request message, performs local check to the state of the designated AAL2 path and performs consistency synchronization on the AAL2 path states at two ends based on the result of check, for example, it modifies the local AAL2 path state such that it is consistent with the path state in the AAL2 switch of the requester, or notifies the AAL2 switch of the requester to modify its AAL2 path state such that it is consistent with the local AAL2 path state thereof.

Hereinafter, the aforementioned path synchronization is further described with the AAL2 switch A as the request end with reference to the different AAL2 path states illustrated in FIGS. 4, 5, and 6.

Figure 4:
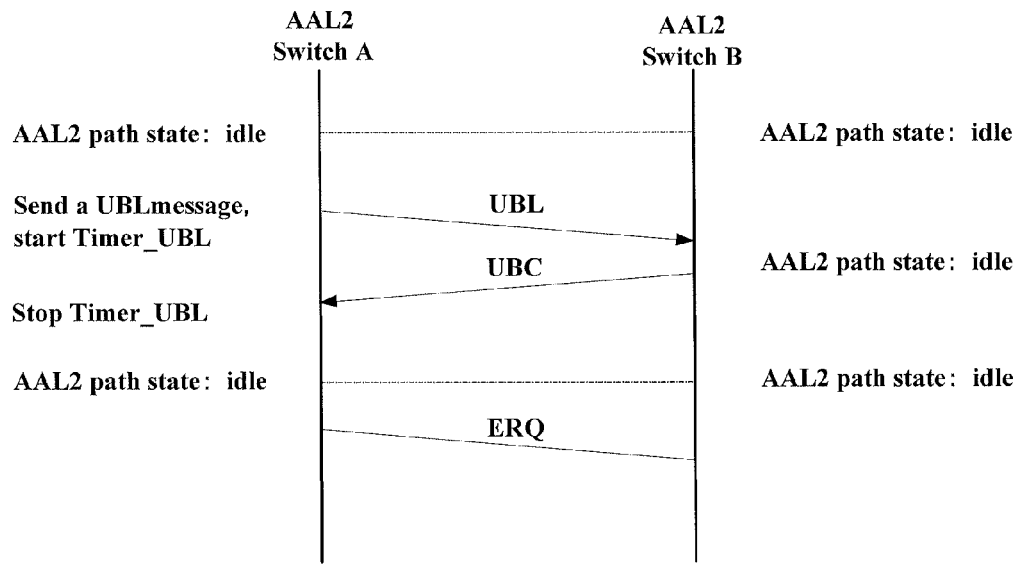
FIG. 4 is embodiment 1 of AAL2 path state synchronization flow according to the present invention.

In embodiment 1 of the AAL2 path state synchronization flow of FIG. 4, in the case that the AAL2 path state of the peer is "idle", the AAL2 path state is synchronized and path is established.

Before establishing the AAL2 path, the signaling entity of AAL2 switch A as the establishment initiating end sends a UBL (unblock request) message to the peer AAL2 signaling node, i.e., switch B, and meanwhile, initiates the timer Timer_UBL, and the path state is set as "idle".

The signaling entity of the peer AAL2 switch B receives the UBL message, and checks and obtains that its local AAL2 path state is "idle" based on the path identifier in the UBL message, and then sends a UBC (unblock confirmation) message to the initiating end AAL2 switch A.

If the signaling entity of AAL2 switch A receives the UBC (unblock confirmation) message sent from the signaling entity of the peer AAL2 switch B during the time period of the timer Timer_UBL, then the present switch stops the timer Timer_UBL, and the path state still maintains "idle". If the signaling entity of switch A does not receive the UBC (unblock confirmation) message sent from the signaling entity of the peer AAL2 switch during the time period of the timer Timer_UBL, it may further send a UBL (unblock request) message to the peer AAL2 switch B.

At this point, the states at two ends of the designated AAL2 path are synchronized into "idle".

Figure 5:
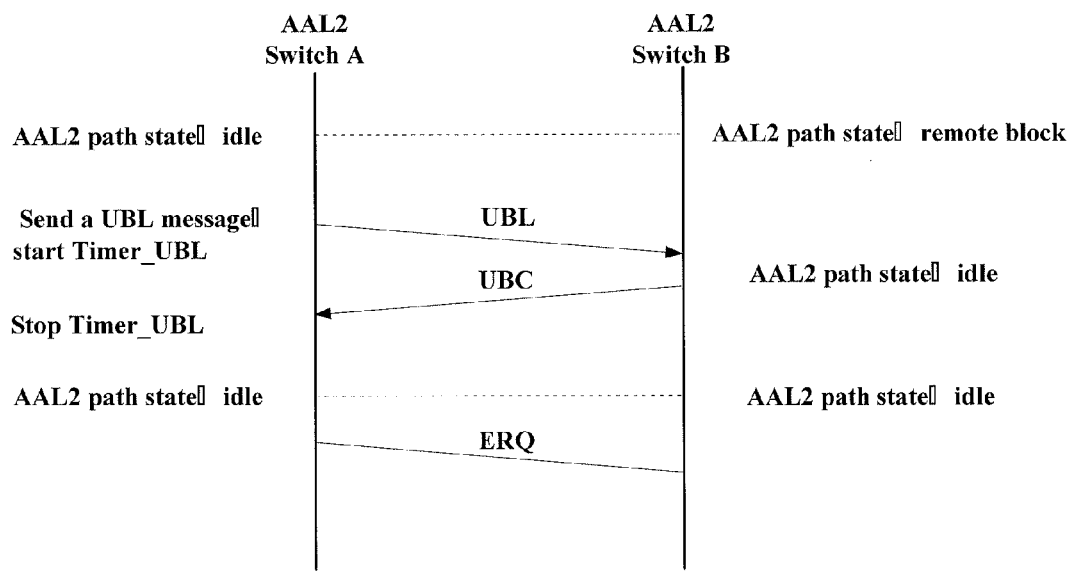
FIG. 5 is embodiment 2 of AAL2 path state synchronization flow according to the present invention.

In embodiment 2 of the AAL2 path state synchronization flow of FIG. 5, in case that the peer AAL2 path state is "remote block", the AAL2 path state is synchronized and path is established.

Before establishing the AAL2 path, the signaling entity of AAL2 switch A as the establishment initiating end sends a UBL (unblock request) message to the peer AAL2 signaling node, i.e., switch B, and meanwhile, initiates the timer Timer_UBL, and the path state is set as "idle".

The signaling entity of the peer AAL2 switch B receives the UBL message, and obtains that its local AAL2 path state is "remote block" based on the path identifier in the UBL message, and then it resets its path state as "idle", and further sends a UBC (unblock confirmation) message to the signaling entity of initiating end AAL2 switch A.

If the signaling entity of AAL2 switch A receives the UBC (unblock confirmation) message sent from the peer AAL2 switch B during the time period of the timer Timer_UBL, then the present switch stops the timer Timer_UBL, and the path state still maintains "idle". If the AAL2 switch A does not receive the UBC (unblock confirmation) message sent from the signaling entity of the peer AAL2 switch B during the time period of the timer Timer_UBL, it may further send a UBL (unblock request) message to the peer AAL2 switch B.

At this point, the states at two ends of the designated AAL2 path are synchronized into "idle".

Figure 6:
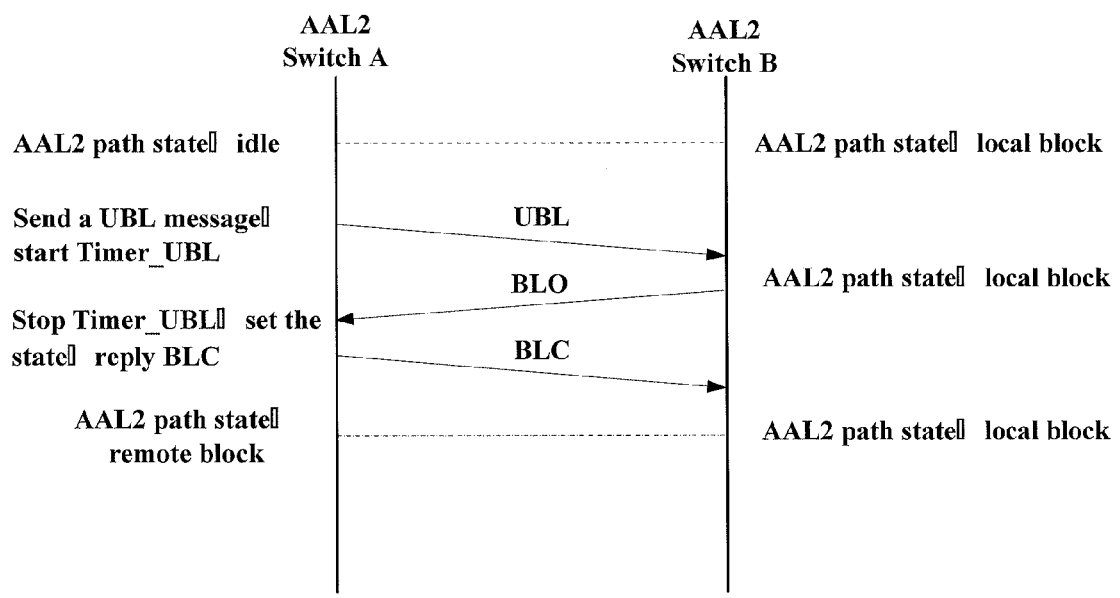
FIG. 6 is embodiment 3 of AAL2 path state synchronization flow according to the present invention.

In embodiment 3 of the AAL2 path state synchronization flow of FIG. 6, in the case that the peer AAL2 path state is "local block", the AAL2 path state is synchronized and path is established.

Before establishing the AAL2 path, the signaling entity of AAL2 switch A as the establishment initiating end sends a UBL (unblock request) message to the peer AAL2 signaling node, i.e., switch B, and meanwhile, initiates the timer Timer_UBL, and the path state is set as "idle".

The signaling entity of the peer AAL2 switch B receives the UBL message for the AAL2 path, checks and obtains that its local AAL2 path state is "local block" based on the path identifier in the UBL message, and neglects the UBL message. With reference to the stipulation in section 8.2.1.2.2.1 b in ITU-T Q.2630.1, it will start the block process and send a BLO (block request) message to the peer AAL2 switch A.

The signaling entity of initiating end AAL2 switch A, when receiving the BLO (block request) message sent from the peer AAL2 switch B, stops the timer Timer_UBL, and the path state is set as "remote block", and the path will not receive a non-test type new call. Afterwards, the signaling entity of AAL2 switch A may further send a BLC (block confirmation) message to the AAL2 switch B.

By far, the states at two ends of the designated AAL2 path are synchronized as "local block" and "remote block".

Although some embodiments have been provided above to illustrate the present invention, they are not used to limit the protection scope of the present invention. Those skilled in the art may perform various modifications on the embodiments without departing from the scope and spirit of the present invention. All such modifications fall within the scope of the present invention.

What is claimed is:

1. A method of synchronizing AAL2 (ATM adaptation layer type 2) path states between AAL2 signaling nodes, comprising steps of:
   a) sending, by a AAL2 signaling node as the synchronization requesting end, a path state request message to a peer AAL2 signaling node of an AAL2 path;
   b) performing, by the peer AAL2 signaling node, local check on the state of an AAL2 path designated by the request message after receiving the request message;
   c) controlling, by the peer AAL2 signaling node, consistency synchronization processing on the AAL2 path states at two ends based on the result of the check,
   wherein the controlling step is initiated at a time when the local AAL2 path state of the peer AAL2 signaling node is one of "idle," "peer block" and "local block".

2. The method according to claim 1, wherein the path state request message in step a) is an unblock request message.

3. The method according to claim 1, wherein in step c), when the peer AAL2 signaling node detects that its local AAL2 path state is "idle", it confirms to the synchronization requesting end AAL2 signaling node.

4. The method according to claim 1, wherein in step c), when the peer AAL2 signaling node detects that its local AAL2 path state is "peer block", it resets the local AAL2 path state as "idle" and confirms to the synchronization requesting end AAL2 signaling node.

5. The method according to claim 1, wherein in step c), when the peer AAL2 signaling node detects that its local AAL2 path state is "local block", it notifies the synchronization requesting end AAL2 signaling node to reset the AAL2 path state.

6. An AAL2 (ATM adaptation layer type 2) signaling node, comprising:
   sending means configured to send a path state request message to a peer AAL2 signaling node;
   controlling means configured to perform consistency reset to the path state of the present AAL2 signaling node based on a response from the peer AAL2 signaling node,
   wherein the performing of the consistency reset, by the controlling means, is initiated at a time when the local path state of the peer AAL2 signaling node is one of "idle," "peer block" and "local block".

7. The AAL2 signaling node according to claim 6, wherein the path state request message of the sending means is an unblock request message.

8. The AAL2 signaling node according to claim 7, wherein the controlling means maintains the local AAL2 path state unchanged when the response message is an unblock confirmation message.

9. The AAL2 signaling node according to claim 6, wherein the controlling means performs consistency reset to the local AAL2 path state with regard to the peer AAL2 signaling node when the response message is a block request message.

10. An AAL2 (ATM adaptation layer type 2) signaling node, comprising:
    receiving means configured to receive a path state request message sent from an AAL2 signaling node;
    controlling means configured to perform local check on the state of an AAL2 path designated in the request message and control consistency synchronization processing on the AAL2 path states at two ends based on the result of the check,
    wherein the controlling of the consistency synchronization processing is initiated at a time when the local AAL2 path state is one of "idle," "peer block" and "local block".

11. The AAL2 signaling node according to claim 10, wherein the path state request message is an unblock request message.

12. The AAL2 signaling node according to claim 10, wherein the controlling means confirms to the peer AAL2 signaling node when the local AAL2 path state is "idle".

13. The AAL2 signaling node according to claim 10, wherein the controlling means resets the local AAL2 path state as "idle" and confirms to the peer AAL2 signaling node when the local AAL2 path state is "peer block."

14. The AAL2 signaling node according to claim 10, wherein the controlling means notifies the peer AAL2 signaling node to reset the AAL2 path state when detecting that its local AAL2 path state is "local block".

15. A method of synchronizing AAL2 (ATM adaptation layer type 2) path states in an AAL2 signaling node, comprising steps of:
- step a), sending a path state request message to a peer AAL2 signaling node;
- step b), performing consistency reset to the path state of present AAL2 signaling node based on a response from the peer AAL2 signaling node, wherein the performing of the consistency reset is initiated at a time when the local path state of the peer AAL2 signaling node is one of "idle," "peer block" and "local block".

16. A method of synchronizing AAL2 (ATM adaptation layer type 2) path states in an AAL2 signaling node, comprising steps of:
- a2), receiving a path state request message sent from an AAL2 signaling node;
- b2), performing local check on a designated AAL2 path state based on the request message and controlling consistency synchronization processing on the AAL2 path states at two ends based on the result of check, wherein the controlling of the consistency synchronization processing is initiated at a time when the local AAL2 path state is one of "idle," "peer block" and "local block".

* * * * *